Figure 1:
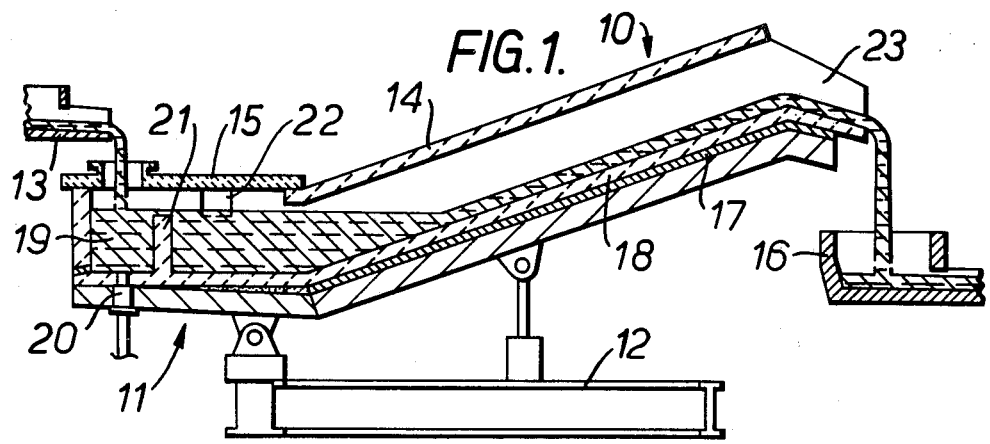

United States Patent [19]

Outhwaite et al.

[11] 3,999,979
[45] Dec. 28, 1976

[54] REMOVAL OF SULPHUR FROM MOLTEN METAL

[75] Inventors: Peter Outhwaite, Near Redcar; Neil Pigott, Rotherham, both of England

[73] Assignee: British Steel Corporation, London, England

[22] Filed: Nov. 24, 1975

[21] Appl. No.: 634,345

[30] Foreign Application Priority Data

Dec. 12, 1974 United Kingdom ............ 53807/74

[52] U.S. Cl. ..................................... 75/58; 13/26; 75/53; 75/61
[51] Int. Cl.$^2$ ........................ C21C 7/02; H05B 5/02
[58] Field of Search ............ 75/83, 63, 59, 61, 58; 13/26

[56] References Cited

UNITED STATES PATENTS 3,467,167  9/1969  Mahin .................................. 75/58
3,734,720  5/1973  Starck ................................... 75/63

*Primary Examiner*—Peter D. Rosenberg
*Attorney, Agent, or Firm*—Bacon & Thomas

[57] ABSTRACT

A system for desulphurizing molten iron in a two-zone vessel located at the foot of an inclined electromagnetic elevator. The molten metal together with added desulphurizing agent is agitated in the first zone of the vessel to thoroughly disperse the desulphurizing agent in the metal. The metal then passes to the second zone of the vessel where it is maintained in a quiescent state relative to the metal in the first zone, so that the slag floats to the surface of the metal and can be removed. The desulphurized metal is removed from the second zone of the vessel by means of the inclined electromagnetic conveyor.

16 Claims, 4 Drawing Figures

U.S. Patent  Dec. 28, 1976  3,999,979

REMOVAL OF SULPHUR FROM MOLTEN METAL

This invention relates to the removal of sulphur from molten metal. It is particularly concerned with the continuous removal of sulphur from molten iron.

The increasing demand for steels of low sulphur content frequently necessitates the removal of sulphur from molten iron before it is used in the steelmaking process. Various techniques of external desulphurisation are known, including the pneumatic injection of desulphurising agents into a ladle full of molten iron, and continuous methods involving the use of some agitating mechanism to promote the reaction between desulphurising agent and the molten iron.

With all desulphurising techniques, it is important that the desulphurising slag formed from the reaction between the molten iron and the desulphurising agent is removed from the metal before it is treated in the steelmaking process. This is because the sulphur contained in the desulphurising slag can revert to the metal under steelmaking conditions, and some desulphurising slags cause severe refractory problems at steelmaking temperatures. With batch techniques for desulphurisation, the slag is either mechanically or manually removed from the upper surface of the metal in the ladle before the metal is charged to the furnace. With continuous techniques a skimmer dam downstream of the treatment vessel is used. Both these methods of slag removal incur losses of metal yield, since particles of iron are generally carried over with the slag.

It is an object of the present invention to provide a technique for reducing the sulphur content of molten metal which reduces the aforesaid disadvantages.

According to one aspect of the invention a method is provided for reducing the sulphur content of molten metal, said method including passing the molten metal into the first zone of a two zone vessel situated at the base of an inclined electromagnetic conveying trough, adding a desulphurising agent to the molten metal, agitating the molten metal and desulphurising agent in the first zone of said two zone vessel, passing the agitated metal into the second zone of said two zone vessel, the metal in the second zone being maintained in a quiescent condition relative to the metal in said first zone whereby to permit substantial separation of the slag formed in the reaction between the molten metal and the desulphurising agent from the molten metal so that the slag may be removed from the upper surface of the metal, and electromagnetically elevating the metal of reduced sulphur content in the inclined conveying trough to remove it from the second zone of said vessel.

According to a further aspect of the invention apparatus is provided for reducing the sulphur content of molten metal, said apparatus including an inclined electroelectromagnetic conveying trough and a vessel situated at the base thereof, means for dividing said vessel into two zones such that the first zone is adapted to receive molten metal and pass it to the second zone, the second zone being connected with the inclined electromagnetic conveying trough, means for adding a desulphurising agent to the molten metal prior to or during the passage of the molten metal through said first zone, means for agitating the molten metal and desulphurising agent in the first zone of the vessel whilst the metal in the second zone is maintained in a quiescent condition relative to that in the first zone by the dividing means, thereby permitting substantial separation of the slag formed in the reaction between the molten metal and the desulphurising agent from the molten metal before the molten metal is carried up the conveying trough.

The desulphurising agent may be added in particulate form in a carrier gas which is passed into the molten metal in the first zone by means of a lance submerged in the metal. Alternatively the desulphurising agent in particulate form may be introduced into the molten metal in a carrier gas passed through a tuyere built into the base or wall of the first zone of the vessel. The carrier gas may be a reactive gas, e.g. natural gas or methane, or a non-reactive gas such as nitrogen. The desulphurising agent may be added to the molten metal before the molten metal stream enters the first zone. The desulphurising agent may be added to the molten metal prior to or during its passage through a vortex-inducing chamber before it passes into the first zone of the vessel. This enhances the degree of mixing of the metal and the desulphurising agent. The metal is preferably introduced into the vortex-inducing chamber by an inlet which extends tangentially to the circular chamber.

The means for agitating the molten metal and desulphurising agent may include a porous plug or tuyere in the base or wall of the first zone through which a gas is introduced under pressure. This gas may be a reactive gas, natural gas or methane, or a non-reactive gas such as nitrogen.

The dividing means separating the first zone from the second zone is preferably in the form of a weir. The weir may be of the underflow type or the overflow type or a combination of underflow and overflow weirs may be used.

The treated metal is elevated at a known rate in the electromagnetic conveying trough into either a batch transfer receptacle or directly to a refining unit. This known rate value may be fed back to the desulphurising agent addition stage, and the rate of input of desulphurising agent adjusted accordingly in order to promote an efficient and economic use of the desulphurising agent.

Typical desulphurising agents which may be used with this technique are powdered lime, calcium carbide or soda ash., FIGS. 1 to 4 show schematically, and by way of example only, four different embodiments of the invention. In the figures, like numerals refer to like parts.

In FIG. 1 an electromagnetic conveying trough 10 of conventional type is shown supported in an inclined position on a frame 12. The base of the conveying trough 10 connects with a vessel 11 which is open on its side adjacent the conveying trough 10. Vessel 11 is also supported on structure 12.

The electromagnetic conveying trough has electromagnetic windings 17. These windings 17 are supplied with current from a controllable source of three-phase power (not shown). The windings 17 are covered with a layer of refractory material 18 which forms the bottom lining of trough 10. A roof 14 minimises the heat loss from metal being passed up the conveying trough 10.

At its upper end the trough 10 is provided with a spout 23 which directs metal flowing up the trough into a further receptacle 16.

The vessel 11 at the base of trough 10 is divided into two zones by means of an overflow weir 21. The vessel 11 is also provided with a refractory lining and a roof 15, which roof minimises the heat loss from the vessel. The vessel 11 also has a slag notch 22 at the top of one of its walls in the second zone of the vessel 11 which is adjacent the base of the trough 10. A tuyere 20 is provided in the base of vessel 11 in the first zone of the vessel.

Molten iron is introduced into the first zone of vessel 11 by means of a runner 13 which extends to above a hole in the roof 15 of the vessel 11. As the molten iron enters the vessel, desulphurising agent in particulate form is injected into the molten iron 19 through the tuyere 20 in the base of vessel 11. The particulate desulphurising agent is carried in nitrogen gas at sufficient pressure to cause violent agitation of the iron and the desulphurising agent. The molten iron and slag then passes from the first zone of vessel 11 over the overflow weir 21 into the second zone of vessel 11 in which the molten metal 19 is maintained in a quiescent condition relative to the metal in the first zone, since the weir 21 prevents the violent action of the gas injection from influencing the molten metal 19 in the second zone of the vessel 11. Whilst the molten metal 19 is in this quiescent condition, the slag formed from the reaction between the molten metal and the desulphurising agent can separate from the molten metal itself and float on the top of the molten metal. This slag is then removed continuously through the slag notch 22. The molten metal which has been subjected to desulphurising treatment is then conveyed up the electromagnetic conveying trough 10 through the spout 23 and into the receptable 16. The rate at which treated metal passes up the conveying trough 10 can be calculated by a known means, and the rate at which desulphurising agent needs to be added to the molten metal can thereby be determined if the initial iron analysis is known. It is important for economic reasons to match the desulphurising agent addition rate (weight per unit time) with the flow rate of the molten metal.

Figure 2:
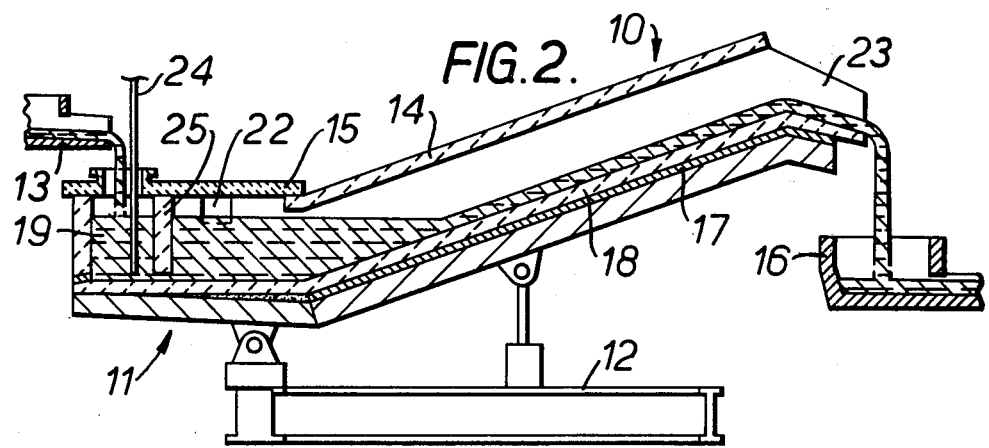

In FIG. 2 the desulphurising agent is added in particulate form through a lance 24 which is submerged in the molten metal in the first zone of vessel 11. The particulate desulphurising agent is again introduced in a gas stream, e.g. natural gas, which causes violent agitation of the molten metal in the first zone of the vessel 11. In this case the first zone is separated from the second zone of vessel 11 by an underflow weir 25 which only permits molten metal to flow through a narrow gap at its base, thereby ensuring that the molten metal in the second zone of the vessel 11 remains in a relatively quiescent condition.

Figure 3:
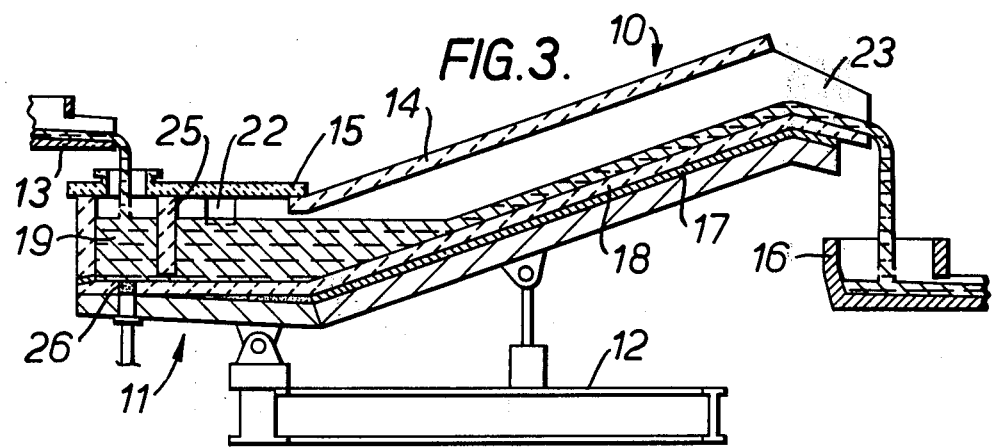

The example of FIG. 3 shows a porous plug 26 in the base of the vessel 11. This porous plug 26 enables an agitating gas to be introduced into the molten metal in the first zone or vessel 11 whilst the desulphurising agent is added to the molten metal in the runner 13 prior to the entry of the molten metal into the vessel 11. The desulphurising agent in this case has already had some time in which to commence reaction with the molten metal. The weir shown in FIG. 3 which separates the first and second zones of FIG. 11 is an underflow weir 25 which substantially prevents the gases introduced through the porous plug 26 from causing agitation to the molten metal of the second zone of vessel 11, so that this metal is maintained in a relatively quiescent condition.

Figure 4:
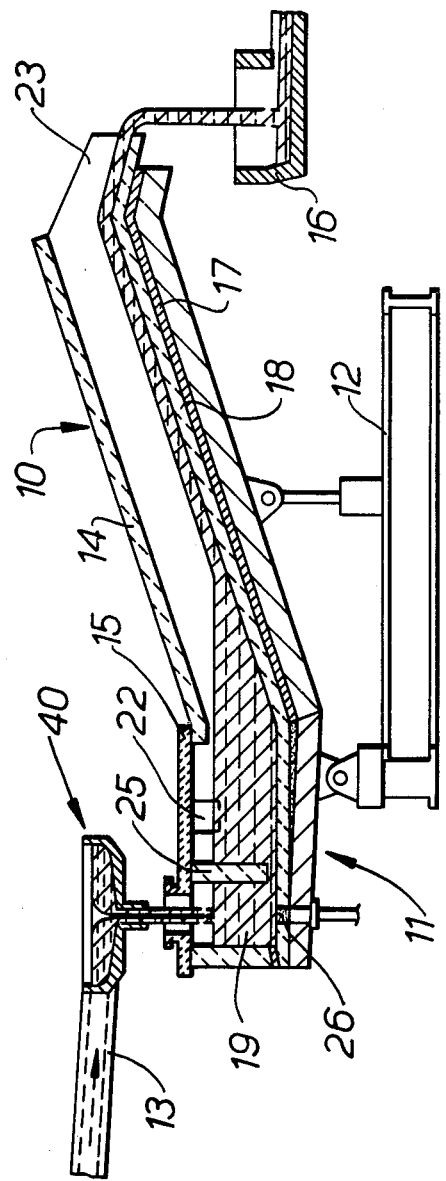

In the example shown in FIG. 4, the molten metal in runner 13 passed through a vortex-inducing chamber 40 before entering the first zone of vessel 11. The metal enters the circular chamber 40 tangentially and swirls round the chamber 40 forming a vortex in the central exit through the base of the chamber 40. Desulphurising agent is added to the metal either in the chamber 40 or immediately prior to entry to the chamber 40 and the vortex provides enhanced mixing of the desulphurising agent with the molten metal.

In any of the described embodiments the metal in the conveying trough and/or vessel may be shrouded by an inert or reducing gas atmosphere. Examples of typical gases are nitrogen, argon, methane or natural gas.

We claim:
1. A method for reducing the sulphur content of molten metal including passing the molten metal into the first zone of a two zone vessel situated at the base of an inclined electromagnetic conveying trough, adding a desulphurising agent to the molten metal, agitating the molten metal and desulphurising agent in the first zone of said two zone vessel, passing the agitated metal into the second zone of said two zone vessel, the metal in the second zone being maintained in a quiescent condition relative to the metal in said first zone whereby to permit substantial separation of the slag formed in the reaction between the molten metal and the desulphurising agent from the molten metal, removing the slag from the upper surface of the metal, and electromagnetically elevating the metal of reduced sulphur content in the inclined conveying trough to remove it from the second zone of said vessel.

2. A method according to claim 1 in which the desulphurising agent is added in particulate form in a carrier gas which is passed into the molten metal in the first zone by means of a lance submerged in the metal.

3. A method according to claim 1 in which the desulphurising agent in particulate form is introduced into the molten metal in a carrier gas passed through a tuyere built into athe base or wall of the first zone of the vessel.

4. A method according to claim 1 in which the desulphurising agent is added in particulate from to the molten metal prior to the entry of the molten metal into the first zone of the vessel.

5. A method according to claim 4 in which the molten metal is passed through a vortex-inducing chamber before entering the first zone of the vessel.

6. A method according to claim 2 in which the carrier gas is a non-reactive gas.

7. A method according to claim 1 in which the agitation of the molten metal is carried out by means of a gas introduced under pressure into the first zone of the vessel.

8. A method according to claim 7 in which the gas is introduced through a porous plug in the base or wall of the first zone of the vessel.

9. A method according to claim 7 in which the agitating gas is a non-reactive gas.

10. A method according to claim 1 in which the first zone and the second zone of the vessel are divided by means of a single wier.

11. A method according to claim 1 in which the rate at which the metal is elevated in the electromagnetic conveying trough is determined.

12. A method according to claim 11 in which the determined rate of elevation of treated metal is fed back to the desulphurising agent addition stage, and the rate of input of the desulphurising agent is adjusted to maintain a substantially constant value for the sulphur content of the desulphurized metal.

13. A method according to claim 1 in which the desulphurising agent is selected from the following substances: powered lime, calcium carbide and soda ash.

14. Apparatus for reducing the sulphur content of molten metal including an inclined electromagnetic conveying trough and a vessel situated at the base thereof, means for dividing said vessel into two zones such that the first zone is adapted to receive molten metal and pass it to the second zone, the second zone being connected with the inclined electromagnetic conveying trough, means for adding a desulphurising agent to the molten metal prior to the passage of the molten metal through said first zone, means for agitating the molten metal and desulphurising agent in the first zone of the vessel whilst the metal in the second zone is maintained in a quiescent condition relative to that in the first zone by the dividing means, thereby permitting substantial separation of the slag formed in the reaction between the molten metal and the desulphurising agent from the molten metal before the molten metal is carried by the conveying trough.

15. Apparatus for reducing the sulfur content of molten metal including an inclined electromagnetic coveying trough and a vessel situated at the base thereof, means for dividing said vessel into two zones such that the first zone is adapted to receive molten metal and pass it to the second zone, the second zone being connected with the inclined electromagnetic conveying trough, means for adding a desulfurizing agent to the molten metal during the passage of the molten metal through said first zone, means for agitating the molten metal and desulfurizing agent in the first zone of the vessel whilst the metal in the second zone is maintained in a quiescent condition relative to that in the first zone by the dividing means, thereby permitting substantial separation of the slag formed in the reaction between the molten metal and the desulfurizing agent from the molten metal before the molten metal is carried by the conveying trough.

16. A method according to claim 1 in which the molten metal is iron.

* * * * *